(12) United States Patent
Kashiwabara et al.

(10) Patent No.: US 10,731,601 B2
(45) Date of Patent: Aug. 4, 2020

(54) CYLINDER HEAD COVER STRUCTURE FOR ENGINE

(71) Applicant: Mazda Motor Corporation, Aki-gun, Hiroshima (JP)

(72) Inventors: Takashi Kashiwabara, Aki-gun (JP); Suguru Fukui, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 60 days.

(21) Appl. No.: 16/031,105

(22) Filed: Jul. 10, 2018

(65) Prior Publication Data
US 2019/0017466 A1 Jan. 17, 2019

(30) Foreign Application Priority Data
Jul. 14, 2017 (JP) ................................. 2017-137866

(51) Int. Cl.

| | |
|---|---|
| *F02B 77/00* | (2006.01) |
| *F02F 7/00* | (2006.01) |
| *F01L 1/46* | (2006.01) |
| *F16H 57/035* | (2012.01) |
| *F01M 13/02* | (2006.01) |
| *F01M 13/04* | (2006.01) |
| *F01L 1/344* | (2006.01) |
| *F01L 1/053* | (2006.01) |
| *F01L 1/02* | (2006.01) |

(52) U.S. Cl.
CPC .............. *F02F 7/006* (2013.01); *F01L 1/053* (2013.01); *F01L 1/344* (2013.01); *F01L 1/46* (2013.01); *F01M 13/02* (2013.01); *F01M 13/04* (2013.01); *F16H 57/035* (2013.01); *F01L 1/022* (2013.01); *F01L 2001/0537* (2013.01); *F01L 2250/02* (2013.01); *F01L 2820/04* (2013.01); *F01L 2820/041* (2013.01); *F01M 2013/027* (2013.01); *F02F 2007/0078* (2013.01)

(58) Field of Classification Search
CPC ................ F02F 7/006; F01L 2820/041; B29C 45/14467
USPC ..................................................... 123/195 C
See application file for complete search history.

(56) References Cited

U.S. PATENT DOCUMENTS

| | | |
|---|---|---|
| 3,194,221 A | 7/1965 | Dinger et al. |
| 4,993,375 A | 2/1991 | Akihiko |
| 10,329,975 B2 | 6/2019 | Fujii et al. |

(Continued)

FOREIGN PATENT DOCUMENTS

| | | |
|---|---|---|
| CN | 1755185 A | 4/2006 |
| CN | 1904332 A | 1/2007 |

(Continued)

*Primary Examiner* — Long T Tran
*Assistant Examiner* — James J Kim
(74) *Attorney, Agent, or Firm* — Alleman Hall Creasman & Tuttle LLP

(57) ABSTRACT

A cylinder head cover structure for an engine includes a cylinder head cover. The cylinder head cover includes a metal cover member forming one end of the cylinder head cover in an engine length direction and a portion adjacent to the one end, and a resin cover member forming a portion of the cylinder head cover other than the metal cover member. The metal cover member is provided with a cam angle sensor attachment to which a cam angle sensor is attached, the cam angle sensor detecting a rotational position of a camshaft of the engine.

3 Claims, 5 Drawing Sheets

(56) References Cited

U.S. PATENT DOCUMENTS

| | | |
|---|---|---|
| 2001/0025633 A1 | 10/2001 | Takada et al. |
| 2001/0042527 A1 | 11/2001 | Uchida |
| 2002/0111087 A1 | 8/2002 | Kuroda et al. |
| 2003/0172632 A1 | 9/2003 | Matsubara et al. |
| 2004/0187838 A1 | 9/2004 | Nonogaki et al. |
| 2006/0070599 A1 | 4/2006 | Nonogaki et al. |
| 2007/0017282 A1* | 1/2007 | Tooyama ................ F01L 1/053 73/114.26 |
| 2008/0060595 A1* | 3/2008 | Yoshijima ............ F01L 1/344 123/90.16 |
| 2010/0192887 A1* | 8/2010 | Iwata ..................... F01L 1/022 123/90.17 |
| 2011/0119915 A1* | 5/2011 | Sanbyakuda ........... F01L 1/047 29/888.011 |
| 2012/0247438 A1 | 10/2012 | Konohara |
| 2014/0224232 A1 | 8/2014 | Hotta |
| 2016/0123199 A1 | 5/2016 | Yamada et al. |
| 2016/0195037 A1* | 7/2016 | Kira ..................... F02F 7/0068 73/114.79 |
| 2016/0265404 A1 | 9/2016 | Fujii et al. |
| 2018/0038274 A1 | 2/2018 | Ebesu et al. |

FOREIGN PATENT DOCUMENTS

| | | |
|---|---|---|
| CN | 101103194 A | 1/2008 |
| CN | 101815850 A | 8/2010 |
| CN | 105569770 A | 5/2016 |
| CN | 205400911 U | 7/2016 |
| JP | H0234713 U | 3/1990 |
| JP | H0343536 U | 4/1991 |
| JP | H06193460 A | 7/1994 |
| JP | 2001329885 A | 11/2001 |
| JP | 2003049625 A | 2/2003 |
| JP | 2003254031 A | 9/2003 |
| JP | 2006242107 A | 9/2006 |
| JP | 2007032309 A | 2/2007 |
| JP | 2009150289 A | 7/2009 |
| JP | 2016160794 A | 9/2016 |
| JP | 2016205240 A | 12/2016 |

* cited by examiner

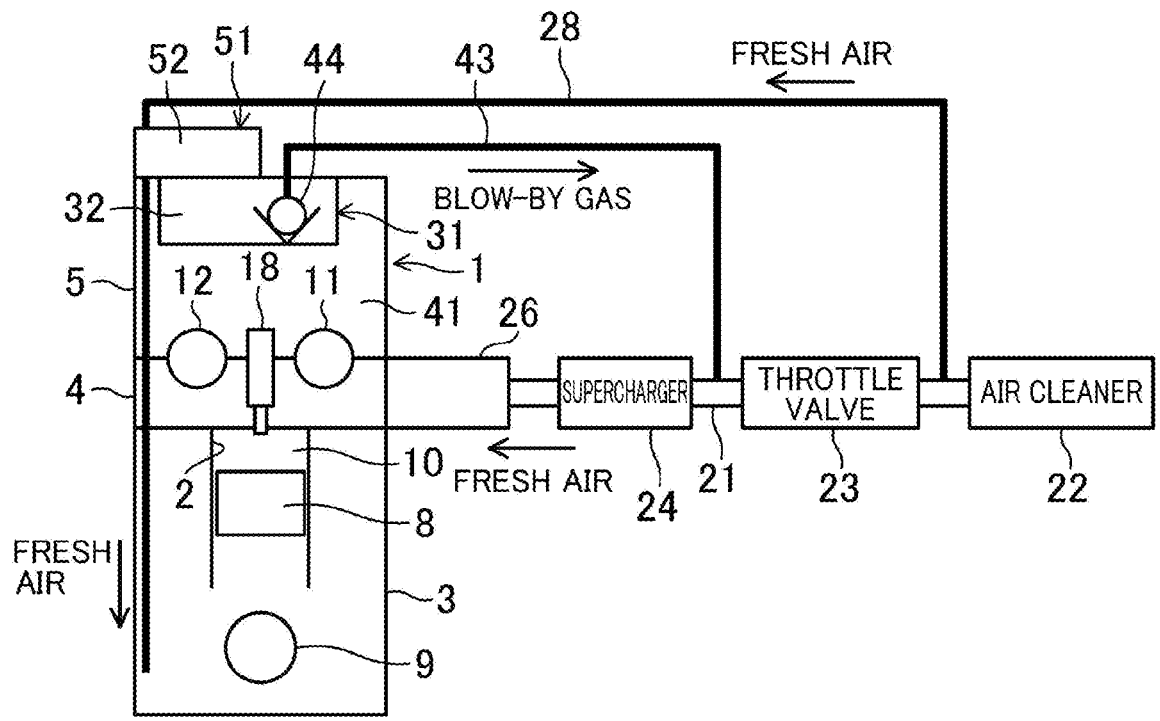
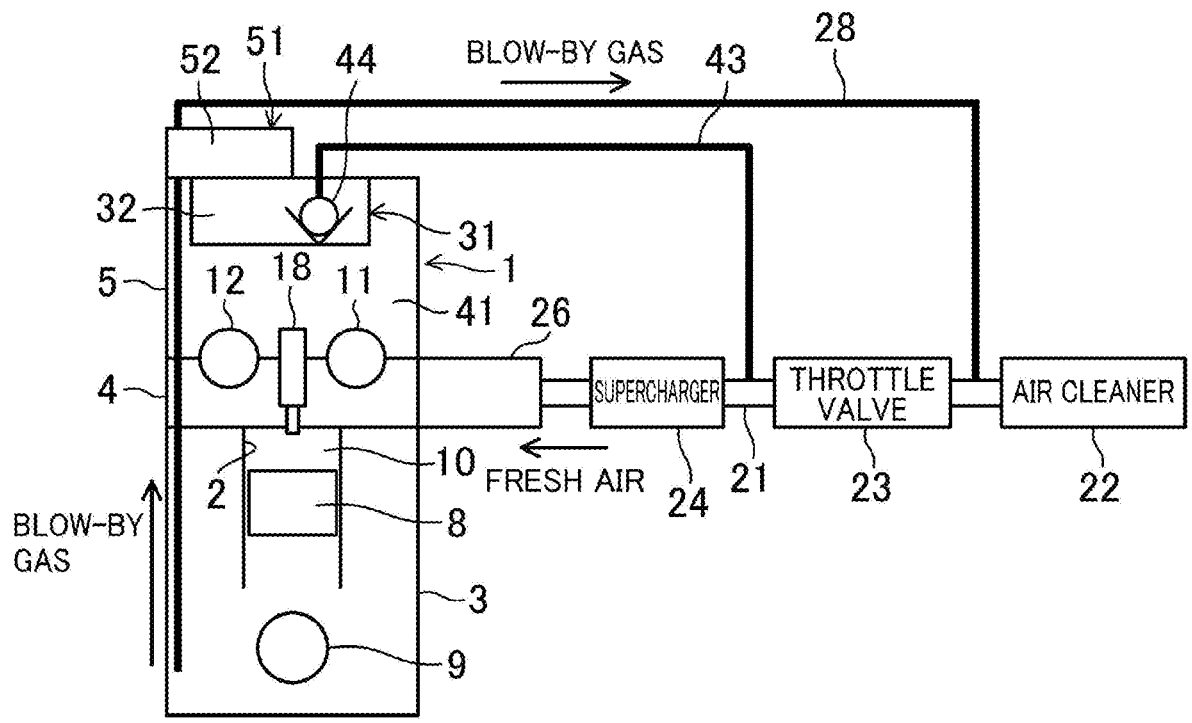

CYLINDER HEAD COVER STRUCTURE FOR ENGINE

CROSS-REFERENCE TO RELATED APPLICATION

This application claims priority to Japanese Patent Application No. 2017-137866 filed on Jul. 14, 2017, the entire disclosure of which is incorporated by reference herein.

BACKGROUND

The technique disclosed in this specification relates to a cylinder head cover structure for an engine.

A typical cylinder head cover of an engine is made of resin as disclosed, for example, in Japanese Unexamined Patent Publication No. 2006-242107. According to the publication, the cylinder head cover includes: a cylinder head cover body made of resin; and a frame member formed of a material (metal) higher in rigidity than the resin forming the cylinder head cover. Integrated with the cylinder head cover body, the frame member is formed continuously to include from a portion on the cylinder head cover body at which the cylinder head is mounted to a portion on which such functional devices for an internal combustion engine as a fuel injection valve and a cam angle sensor are provided or penetrate. Such features make it possible to reduce the weight of the cylinder head cover and increase the rigidity of a portion between the cylinder head mounting portion and the portion where the functional devices for the internal combustion engine are provided or penetrate. As a result, the cylinder head cover contributes to maintaining high positioning accuracy of the functional apparatuses for the internal combustion engine.

SUMMARY

For the cylinder head cover cited in the above publication, the frame member is insert-molded when the cylinder head cover body is molded. Hence, it is difficult to increase the size of the frame member, such that the frame member cannot be provided anywhere but on a portion between the cylinder head mounting portion and the portion on which the functional devices for the internal combustion engine are provided or penetrate. As a result, when a component which requires high support strength is to be supported by the cylinder head cover, it is difficult to satisfy the requirement for the component.

The technique disclosed herein intends to provide a cylinder head cover structure for an engine. The cylinder head cover is light in weight, and a cam angle sensor, that is, a component which requires high support strength, can be mounted on the cylinder head cover with high support strength.

In order to achieve the intention, a cylinder head cover structure for an engine is provided below.

This cylinder head cover structure for an engine includes a cylinder head cover covering a top of a cylinder head of the engine, wherein the cylinder head cover includes: a metal cover member forming one end of the cylinder head cover in an engine length direction and a portion adjacent to the one end; and a resin cover member forming a portion of the cylinder head cover other than the metal cover member, and the metal cover member is provided with a cam angle sensor attachment to which a cam angle sensor is attached, the cam angle sensor detecting a rotational position of a camshaft of the engine.

Such features make it possible to reduce the entire weight of the cylinder head cover, and allow the cam angle sensor, which requires high support strength in view of detection accuracy, to be mounted on the cylinder head cover with high support strength. Moreover, the features can reduce the risk of deterioration in detection accuracy by thermal expansion caused when the cam angle sensor attachment is provided to the resin cover member.

In the above structure, the cam angle sensor may be one of two cam angle sensors and the cam angle sensor attachment may be one of two cam angle sensor attachments. The metal cover member may be provided with the two cam angle sensors spaced apart from each other in an engine width direction. A recess may be formed on an end of the metal cover member toward the resin cover member in the engine length direction, and positioned between the two cam angle sensor attachments, the recess being notched away from the resin cover member in the engine length direction, and a protrusion may be formed on an end of the resin cover member toward the metal cover member in the engine length direction, the protrusion protruding toward the metal cover member in the engine length direction to fit into the recess.

Such features allow the recess positioned between the two cam angle sensor attachments to minimize the size of the metal cover member, making it possible to reduce the entire weight of the cylinder head cover to the minimum.

In the above structure, a chain cover may be mounted to an end of the metal cover member away from the resin cover member in the engine length direction.

Such features make it possible to mount the chain cover to the cylinder head cover with high support strength. As a result, for example, a motor for an electric variable valve timing mechanism can be mounted on the chain cover.

In the above structure with the mounted chain cover, the chain cover may be separated into a head cover and a block cover, the head cover corresponding to the cylinder head of the engine and the cylinder head cover, and the block cover corresponding to the cylinder block of the engine, and a transmission may be coupled to an end face of the cylinder block of the engine that is toward the metal cover member in the engine length direction, the transmission being coupled via the block cover of the chain cover.

Such features make it possible to mount the head cover of the chain cover on the cylinder head cover with high support strength. Even though the engine and the transmission are coupled to each other and mounted in the vehicle, the features allow the head cover of the chain cover to be removed from the cylinder head and the metal cover member. As a result, the chain can be removed, so that the cylinder head and/or the cylinder head gasket can be easily replaced with a new cylinder head and/or a new cylinder head gasket.

BRIEF DESCRIPTION OF THE DRAWINGS

FIG. 1A is a schematic view of an engine to which a cylinder head cover structure according to an exemplary embodiment is applied, the view illustrating flows of fresh air and blow-by gas when the engine is not supercharged.

FIG. 1B is a view corresponding to FIG. 1A and illustrating flows of the fresh air and the blow-by gas when the engine is supercharged.

DETAILED DESCRIPTION

Figure 2:
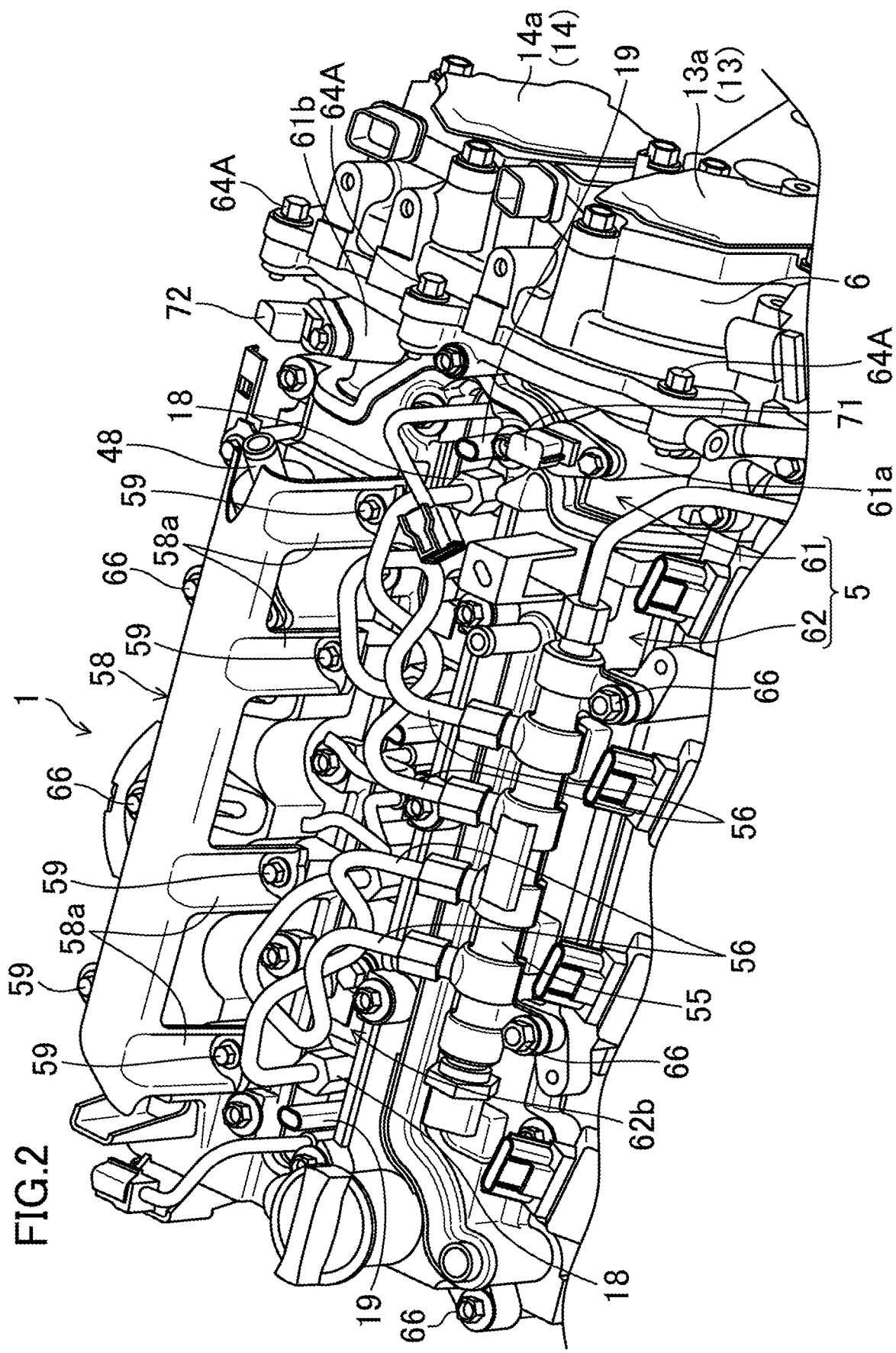
FIG. 2 is a perspective view illustrating an upper portion of the engine.

An exemplary embodiment will now be described in detail with reference to the drawings.

FIGS. 1A and 1B illustrate a schematic configuration of an engine 1 to which a cylinder head cover structure according to an exemplary embodiment is applied. In this exemplary embodiment, the engine 1 is an in-line four-cylinder engine transversely mounted in an engine compartment located in the front of a vehicle, such that a crankshaft 9 extends along the width of the vehicle (i.e., perpendicular to drawing planes of FIGS. 1A and 1B).

The engine 1 includes: a cylinder block 3 in which four cylinders 2 (FIGS. 1A and 1B illustrate one cylinder alone) are arranged in line along the axis of the crankshaft 9; a cylinder head 4 provided on the cylinder block 3; and a cylinder head cover 5 covering a top of this cylinder head 4. A piston 8 is reciprocatably inserted into each of the cylinders 2. The piston 8 in each cylinder 2 is connected to the crankshaft 9 via a not-shown connecting rod.

Although not shown, the cylinder head 4 has: an intake port and an exhaust port formed for each cylinder 2 to communicate with a combustion chamber 10; and an intake valve and an exhaust valve provided for each cylinder 2 to open and close openings, of the intake port and the exhaust port, toward the combustion chamber 10.

Between the upper portion of the cylinder head 4 and the lower portion of the cylinder head cover 5, an intake camshaft 11 and an exhaust camshaft 12 are arranged to extend along the axis of the crankshaft 9. The intake camshaft 11 is provided with cams to open and close the intake valves of all the cylinders 2. The exhaust camshaft 12 is provided with cams to open and close the exhaust valves of all the cylinders 2.

Figure 4:
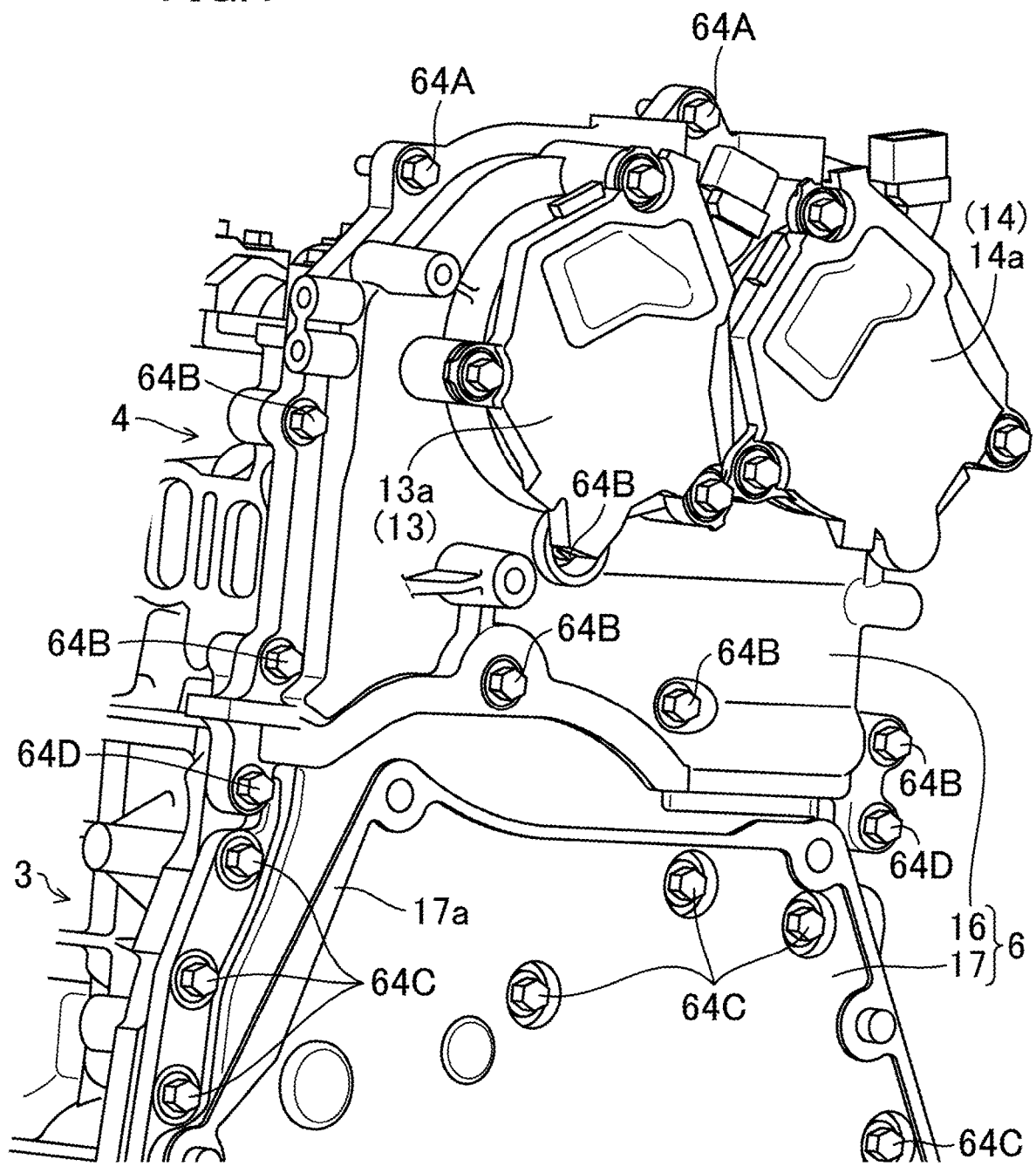
FIG. 4 is a perspective view illustrating an end of the engine to the rear (to a transmission) with the cylinder head cover omitted.

Timing at which the intake valve and the exhaust valve open is made variable by each of a variable valve timing (VVT) mechanism 13 for intake and a VVT mechanism 14 for exhaust illustrated in FIGS. 2 and 4. In this exemplary embodiment, the VVT mechanism 13 for intake and the VVT mechanism 14 for exhaust are electric VVT mechanisms. The VVT mechanism 13 includes a VVT motor 13a for intake to vary the timing of opening the intake valve, and the VVT mechanism 14 includes a VVT motor 14a for exhaust to vary the timing of opening the exhaust valve. Examples of the VVT motors 13a and 14a include stepping motors. These VVT motors 13a and 14a are each mounted on and fastened to an exterior face of a chain cover 6 described below. The VVT motor 13a is positioned in an extension of the shaft center of the intake camshaft 11. The VVT motor 14a is positioned in an extension of the shaft center of the exhaust camshaft 12.

Moreover, the cylinder head 4 is provided with an injector 18 for each cylinder 2 to inject fuel. This injector 18 has a fuel injection nozzle provided to a ceiling face of the combustion chamber 10 to be oriented to the combustion chamber 10. The injector 18 injects and supplies the fuel directly to the combustion chamber 10 when the piston 8 reaches near the top dead center during the compression stroke.

An intake passage 21 is connected to a face, of the cylinder head 4, toward the front of the vehicle to communicate with the intake port of the cylinder 2. This intake passage 21 is provided with an air cleaner 22, a throttle valve 23, and a supercharger 24 in order from upstream. The supercharger 24 supercharges the combustion chamber 10 with intake air. An intake manifold 26 is provided downstream of the intake passage 21. The intake manifold 26 branches into independent passages each provided to a corresponding one of the cylinders 2. Each independent passage has a downstream end connected to the intake port of the corresponding cylinder 2.

Although not shown, an exhaust passage is connected to a face, of the cylinder head 4, toward the rear of the vehicle. The exhaust passage expels exhaust gas from the combustion chamber 10 of the cylinder 2. An exhaust manifold is provided upstream of this exhaust passage. The exhaust manifold includes independent passages each provided to a corresponding one of the cylinders 2 and connected to the exhaust port, and a collector in which the independent passages collect.

The cylinder head cover 5 is formed into a closed-end tube having a top closed and a bottom opened. The cylinder head cover 5 is secured to a top end of the cylinder head 4 to cover the tops of the intake camshaft 11 and the exhaust camshaft 12.

An interior of the cylinder head cover 5 is provided with a first oil separator 31. This first oil separator 31 includes an oil separating chamber 32 for separating and removing oil mist contained in blow-by gas. This oil separating chamber 32 is separately defined from a cam housing 41 in which the intake camshaft 11 and the exhaust camshaft 12 are provided. The oil separating chamber 32 has an outlet provided with a positive crankcase ventilation (PCV) valve 44 releasing the blow-by gas, from which the oil mist is separated and removed in the oil separating chamber 32, from the oil separating chamber 32 through a blow-by gas passage 43 to an intake system (i.e., a portion between the throttle valve 23 and the supercharger 24 in the intake passage 21) of the engine 1. A pipe 48 (see FIGS. 2 and 3) connected to this PCV valve 44 protrudes upward from a top face of the cylinder head cover 5. A hose (not shown) is connected to the pipe 48. The hose, namely, the blow-by gas passage 43, connects the pipe 48 and the portion between the throttle valve 23 and the supercharger 24 in the intake passage 21.

The PCV valve 44 functions as a blow-by gas flow rate control valve. When the engine 1 is not supercharged by the supercharger 24 as illustrated in FIG. 1A, a pressure to a downstream side of the throttle valve 23 in the intake passage 21 becomes negative. This negative pressure causes the blow-by gas to flow back through the blow-by gas passage 43 to the portion between the throttle valve 23 and the supercharger 24 in the intake passage 21. An opening of the PCV valve 44 varies depending on a degree of the negative pressure. The larger the absolute value of the negative pressure is, the smaller the opening of the PCV valve 44 becomes and the smaller the amount of the blow-by gas to flow back is.

In this exemplary embodiment, a fresh air introduction passage 28 branches off from the portion between the air cleaner 22 and the throttle valve 23 in the intake passage 21. The fresh air introduction passage 28 is for introducing fresh air into a lower portion of the cylinder block 3. The fresh air introduced into the lower portion of this cylinder block 3 keeps the oil from degrading. The fresh air introduction passage 28 runs through (i) an oil separating chamber 52 of a second oil separator 51 provided to an exterior of the cylinder head cover 5 and (ii) the cylinder head 4, and reaches the lower portion of the cylinder block 3 (below the piston 8). When the engine 1 is not supercharged, the fresh air is introduced into the combustion chamber 10 and a pressure in a lower portion of the cylinder block 3 becomes negative. Hence, as illustrated in FIG. 1A, the fresh air is introduced into the lower portion of the cylinder block 3 through the fresh air introduction passage 28. Together with the blow-by gas, the introduced fresh air flows back through the oil separating chamber 32 of the first oil separator 31 and the blow-by gas passage 43 into the portion between the throttle valve 23 and the supercharger 24 in the intake passage 21.

Meanwhile, when the engine 1 is supercharged by the supercharger 24 as illustrated in FIG. 1B, the throttle valve 23 is in a full open position such that the pressure to the downstream side of the throttle valve 23 in the intake passage 21 becomes equal to the atmospheric pressure. This does not allow the blow-by gas to flow back through the blow-by gas passage 43 to the portion between the throttle valve 23 and the supercharger 24 in the intake passage 21. However, the pressure in the lower portion of the cylinder block 3 becomes positive. Thus, the blow-by gas flows backward through the fresh air introduction passage 28 into the portion between the air cleaner 22 and the throttle valve 23 in the intake passage 21. (The fresh air is not introduced into the lower portion of the cylinder block 3.) In this case, the blow-by gas passes through the oil separating chamber 52 of the second oil separator 51. This oil separating chamber 52 is configured in a similar manner as the oil separating chamber 32 of the first oil separator 31. (Note that the oil separating chamber 52 is not provided with such a valve as the PCV valve 44 provided to the outlet 34 of the oil separating chamber 52.) In this oil separating chamber 52, the oil mist contained in the blow-by gas is separated and removed. Hence, also when the engine 1 is supercharged, the blow-by gas from which the oil mist is separated and removed can flow back into the intake system of the engine 1.

As illustrated in FIG. 2, a fuel rail 55 is provided above the cylinder head cover 5 (specifically, a resin cover member 62 described below) to the front of the engine 1. The fuel rail 55 extends along the axis of the crankshaft 9 (along the width of the vehicle). At one end, four fuel pipes 56 are connected to the fuel rail 55. At the other end, each of the fuel pipes 56 is connected to a corresponding one of the injectors 18 of the cylinders 2.

A protector 58 is provided above the cylinder head cover 5 (specifically, the resin cover member 62 described below) to the rear of the vehicle. The protector 58 extends in the vehicle width direction. When the vehicle is in a collision (in a front collision) causing the engine 1 to recede, this protector 58 is to keep the fuel rail 55 and the end of each fuel pipe 56 from colliding with a not-shown cowl member located in the rear of the vehicle with respect to the engine 1. The protector 58 is fastened with bolts 59 to the top face of the cylinder head cover 5 via legs 58a extending downward.

Here, the "rear" of the engine 1 is to the output side (in the right of FIGS. 2 and 3) of the crankshaft 9 toward a transmission described below. The "front" of the engine 1 is opposite (in the left of FIGS. 2 and 3) the rear. The axial direction of the crankshaft 9 is also referred to as a longitudinal direction of the engine 1. Moreover, when the engine 1 is viewed from the rear toward the front, the left of the engine 1 is referred to as the "left", the right of the engine 1 is referred to as the "right", and the transverse direction of the engine 1 is also referred to as the "width direction."

Described below is a specific configuration of the cylinder head cover 5, with reference to FIGS. 2 to 5.

The cylinder head cover 5 includes two members, namely, a metal cover member 61 (made of aluminum alloy in this exemplary embodiment), and the resin cover member 62. The metal cover member 61 forms one end of the cylinder head cover 5 in the longitudinal direction of the engine 1 (also in the longitudinal direction of the cylinder head cover 5) and a portion adjacent to the one end. The resin cover member 62 forms a portion of the cylinder head cover 5 other than the one end and the portion adjacent to the one end. In this exemplary embodiment, the metal cover member 61 forms an end of the cylinder head cover 5 to the rear of the engine 1 (an end of the cylinder head cover 5 to the left of the vehicle), and a portion adjacent to the one end.

In this exemplary embodiment, an end face of the engine 1 to the rear (end faces of the cylinder block 3 and the cylinder head 4 to the rear of the engine 1) is provided with a chain 15 (see FIG. 5) and the chain cover 6 (see FIGS. 2 and 4). The chain 15 drives the intake camshaft 11 and the exhaust camshaft 12 through the crankshaft 9. The chain cover 6 (see FIGS. 2, 4, and 5) is made of metal, and covers the chain 15 from the rear of the engine 1. In this exemplary embodiment, the chain cover 6 is also made of aluminum alloy. An upper end of the chain cover 6 is attached to and fastened with bolts 64A to an end face, of the metal cover member 61, to the rear of the engine 1.

In this exemplary embodiment, the chain cover 6 is vertically separated into two pieces, namely, a head cover 16 (an upper portion) corresponding to the cylinder head 4 and the cylinder head cover 5, and a block cover 17 (a lower portion) corresponding to the cylinder block 3. The head cover 16, except for the upper portion fastened to the metal cover member 61 is attached and fastened with bolts 64B to the cylinder head 4. The block cover 17 is attached and fastened with bolts 64C to the cylinder block 3. In these attaching and fastening states, a lower end of the head cover 16 overlaps an upper end of the block cover 17 from the outside of the cover (from the rear of the engine 1). Note that the head cover 16 is fastened with two bolts 64D also to the cylinder block 3. Moreover, the upper end of the block cover 17 at the center in the engine width direction is mounted on and fastened to the cylinder block 3 with bolts 64B also fastening the lower end of the head cover 16.

A transmission (an automatic transmission in this exemplary embodiment; not shown) is coupled through the block cover 17 of the chain cover 6 to an end face of the cylinder block 3 to the rear of the engine 1. The crankshaft 9 is connected to an input shaft of the transmission such that the power of the engine 1 is transmitted to the transmission. As illustrated in FIG. 4, a transmission contact face 17a is formed on an outer face (a face to the rear of the engine 1) of the block cover 17. A face of the transmission to the engine 1 makes contact with the transmission contact face 17a. As described above, the chain cover 6 is vertically separated into two pieces. That is why even though the engine 1 and the transmission are coupled to each other and mounted in the engine compartment, the head cover 16 of the chain cover 6 may be removed from the cylinder head 4 and the metal cover member 61. Such a feature allows the chain 15 to be removed (simply decoupling the chain 15 from the intake camshaft 11 and the exhaust camshaft 12), so that the cylinder head 4 and a cylinder head gasket (not shown) sealing a space between the cylinder head 4 and the cylinder block 3 can be easily replaced with a new cylinder head and a new cylinder head gasket. Note that, in FIG. 4, an illustration of the cylinder head cover 5 is omitted.

Figure 3:
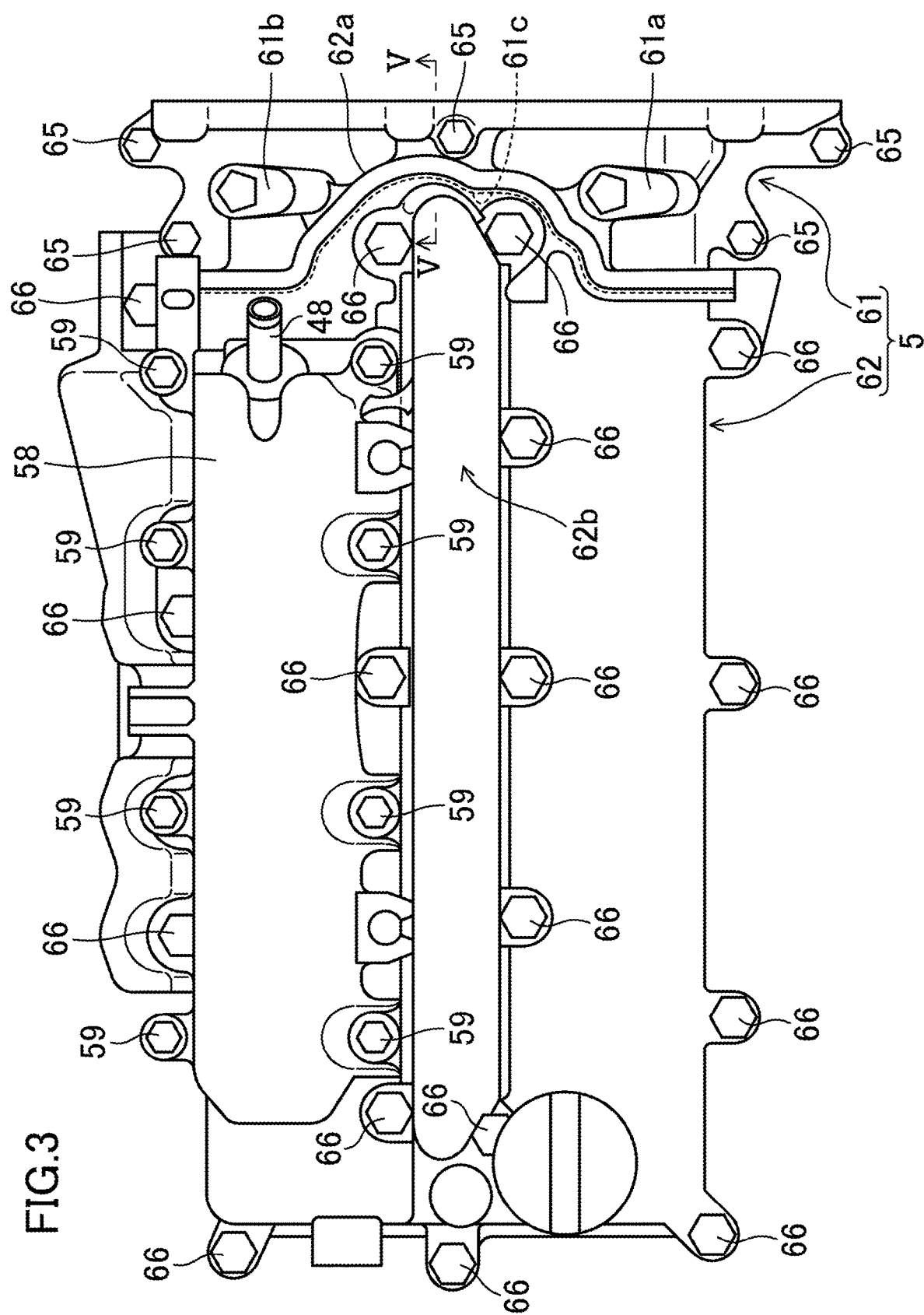
FIG. 3 is a plan view illustrating a cylinder head cover of the engine.

As illustrated in FIGS. 2 and 3, the metal cover member 61 is fastened with bolts 65 to the cylinder head 4. Moreover, the resin cover member 62 is fastened with bolts 66 to the cylinder head 4. In these fastening states, an end of the resin cover member 62 to the rear of the engine 1 and an end of the metal cover member 61 to the front of the engine 1 overlap so that the end of the resin cover member 62 is placed above the end of the metal cover member 61. A rubber gasket 68 is provided to a space between the overlapping ends of the metal cover member 61 and the resin cover member 62. (See FIG. 5.) The rubber gasket 68 seals the space. This rubber gasket 68 is an endless gasket, and seals a space between an outer periphery of a bottom face of the resin cover member 62 (except for the end of the resin cover member 62 to the rear of the engine 1) and the top face of the cylinder head 4. Note that liquid gasket is provided in a space between a bottom face of the metal cover member 61 and the cylinder head 4.

An intake cam angle sensor attachment 61a (see FIGS. 2 and 3) is provided to the metal cover member 61, in an intermediate portion of the engine length direction, to the left of the engine 1 (to the front of the vehicle). The intake cam angle sensor attachment 61a is provided with an intake cam angle sensor 71 detecting a rotational position of the intake camshaft 11. An exhaust cam angle sensor attachment 61b (see FIGS. 2 and 3) is provided to the metal cover member 61, in the intermediate portion of the engine length direction, to the right of the engine 1 (to the rear of the vehicle). The exhaust cam angle sensor attachment 61b is provided with an exhaust cam angle sensor 72 detecting a rotational position of the exhaust camshaft 12. Specifically, the intake cam angle sensor attachment 61a and the exhaust cam angle sensor attachment 61b are provided on the metal cover member 61 and spaced apart from each other in the engine width direction.

A recess 61c is formed on an end (toward the front of the engine 1) of the metal cover member 61, in the center in the engine width direction. In other words, the end of the metal cover member 61 on which the recess 61c is formed is the end, in the engine length direction, toward the resin cover member 62. The recess 61c is notched to the rear of the engine 1, and located between the intake cam angle sensor attachment 61a and the exhaust cam angle sensor attachment 61b.

Figure 5:
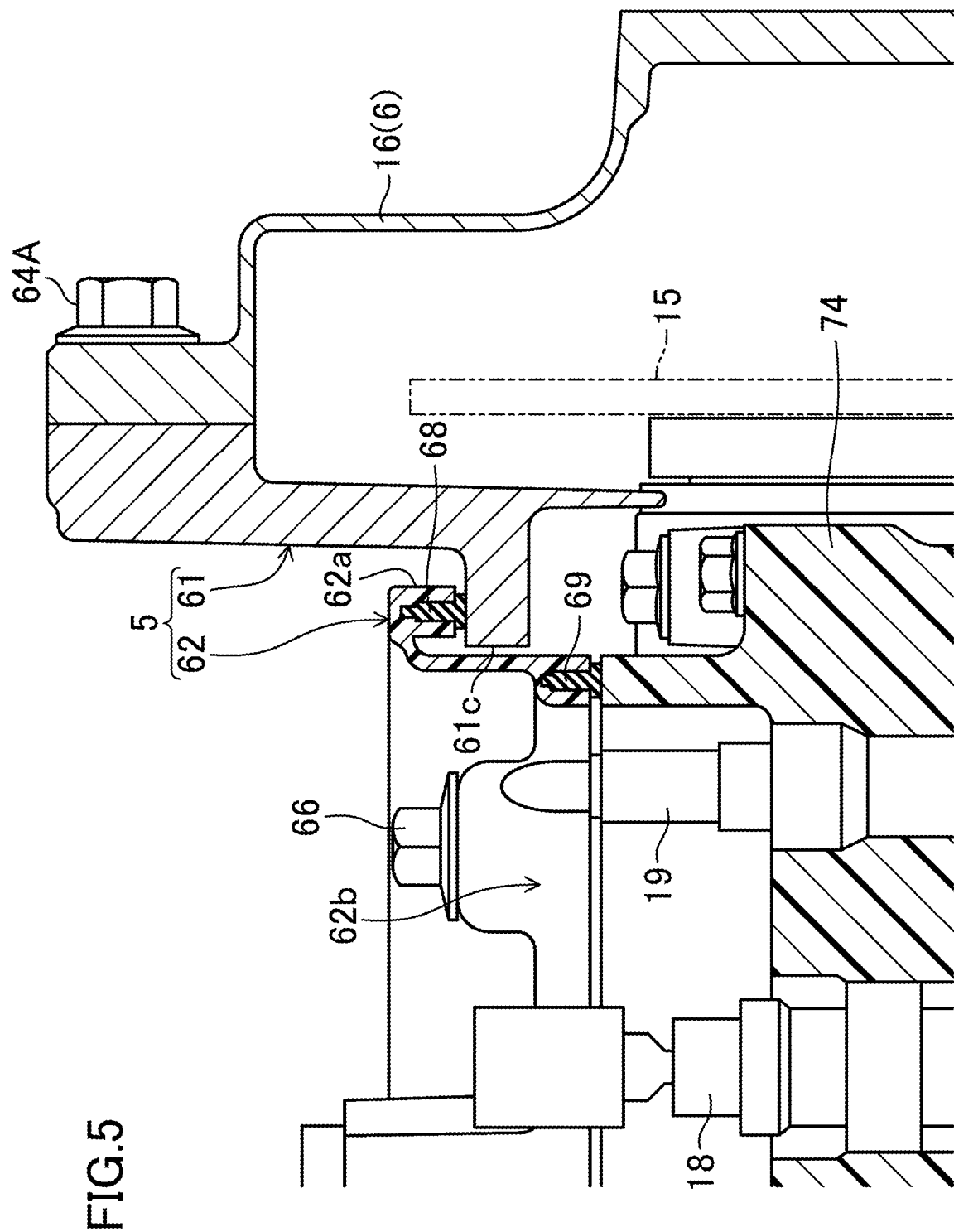
FIG. 5 is a cross-sectional view of a metal cover member, a resin cover member, a chain cover, and a holder of the cylinder head cover, the view being taken along line V-V of FIG. 3.

A protrusion 62a is formed on an end (toward the rear of the engine 1) of the resin cover member 62, in the center in the engine width direction. In other words, the end of the resin cover member 62 on which the protrusion 62a is formed is the end, in the engine length direction, toward the metal cover member 61. When the metal cover member 61 and the resin cover member 62 are fastened to the cylinder head 4, the protrusion 62a conforms to the recess 61c of the metal cover member 61 and protrudes to the rear of the engine 1. This protrusion 62a is provided to the resin cover member 62 in the transverse center of the engine 1 to form a slot 62b extending in the longitudinal direction of the engine 1. Specifically, as illustrated in FIG. 5, the slot 62b includes therein the injector 18 of each cylinder 2 and a top end of a cylinder pressure sensor 19 detecting a pressure inside each of the cylinder 2. An end of the slot 62b to the rear of the engine 1 is located to be able to accommodate the injector 18 and the cylinder pressure sensor 19 for the rearmost cylinder 2 of the engine 1. That is why the protrusion 62a is formed. The injectors 18 and the cylinder pressure sensors 19 for all of the cylinders 2 are vertically inserted through and held with a holder 74 provided below, and blocking, the slot 62b. A rubber gasket 69 (see FIG. 5) is provided to a space between a top face of the holder 74 and a bottom face of a periphery of the slot 62b of the resin cover member 62. The rubber gasket 69 seals the space.

Although a detailed illustration is omitted, the first oil separator 31 is provided to the interior of the resin cover member 62. The second oil separator 51 is provided to the exterior of the resin cover member 62.

Here, the intake cam angle sensor 71 and the exhaust cam angle sensor 72 need to be mounted to the cylinder head cover 5 with high support strength in view of detection accuracy. If the entire cylinder head cover 5 were made of metal, both of the cam angle sensors 71 and 72 could be mounted on the cylinder head cover 5 with high support strength. However, then the cylinder head cover 5 cannot be made light in weight.

Hence, in this exemplary embodiment, the cylinder head cover 5 includes: the metal cover member 61 forming one end of the cylinder head cover 5 in the engine length direction and a portion adjacent to the one end (a portion adjacent to the intake cam angle sensor attachment 61a and the exhaust cam angle sensor attachment 61b); and the resin cover member 62 forming a portion of the cylinder head cover 5 other than the metal cover member 61. The metal cover member 61 is provided with the intake cam angle sensor attachment 61a and the exhaust cam angle sensor attachment 61b to which the intake cam angle sensor 71 and the exhaust cam angle sensor 72 are attached, respectively. Formed as a block in whole, the metal cover member 61 is mounted on and secured to the cylinder head 4. The metal cover member 61 mounted and secured in this manner can be interpreted as a part of the cylinder head 4. Hence, the entire cylinder head cover 5 is made light in weight, and the intake cam angle sensor 71 and the exhaust cam angle sensor 72, which require high support strength, can be mounted on the cylinder head cover 5 (the metal cover member 61) with high support strength. Moreover, reduced can be the risk of deterioration in detection accuracy by thermal expansion caused when the intake cam angle sensor attachment 61a and the exhaust cam angle sensor attachment 61b are provided to the resin cover member 62.

Furthermore, in this exemplary embodiment, the end face of the metal cover member 61 to the rear of the engine 1 is provided with the chain cover 6 (the head cover 16) which the intake VVT motor 13a and the exhaust VVT motor 14a are mounted on and secured to. Similar to the cam angle sensors 71 and 72, the VVT motors 13a and 14a also require high support strength. The chain cover 6 (the head cover 16) which these VVT motors 13a and 14a are mounted on and secured to also require high support strength. Because such a chain cover 6 is mounted on and secured to the metal cover member 61, the chain cover 6 can be mounted to the cylinder head cover 5 with high support strength.

The present invention is not limited to the exemplary embodiment described above. Any replacement may be made within the scope of the claims.

For example, in the exemplary embodiment, the VVT motors 13a and 14a are mounted on and secured to the chain cover 6 provided to the rear end face of the engine 1. Alternatively, when such components which require high support strength as the VVT motors 13a and 14a are not mounted or secured, the end of the cylinder head cover 5 to the front of the engine 1 (the end away from the chain cover 6) and a portion adjacent to the end may constitute the metal cover member 61 and the portion of the cylinder head cover 5 other than the metal cover member 61 may constitute the resin cover member 62. In this case, too, the metal cover member 61 is provided with the intake cam angle sensor attachment 61a and the exhaust cam angle sensor attachment 61b.

Moreover, the chain 15 and the chain cover 6 may be provided to the front end face of the engine 1. In this case, the chain cover 6 does not have to be separated into the head cover 16 and the block cover 17. When the VVT motors 13a and 14a are mounted on and secured to this chain cover 6, an end of the cylinder head cover 5 to the front of the engine 1 and the portion adjacent to the end may constitute the metal cover member 61. The chain cover 6 may be mounted on an end (especially an end face) of the metal cover member 61 to the front of the engine 1.

The embodiments described above are mere examples and are not to be construed as limiting the scope of the present invention. The scope of the present invention is defined by the appended claims, and all variations and modifications belonging to a range equivalent to the range of the claims are within the scope of the present invention.

What is claimed is:

1. A cylinder head cover structure for an engine, the structure comprising:
   a cylinder head cover covering a top of a cylinder head of the engine, the cylinder head cover including:
      a metal cover member forming one end of the cylinder head cover in an engine length direction and a portion adjacent to the one end; and
      a resin cover member forming a portion of the cylinder head cover other than the metal cover member, wherein
   the metal cover member is provided with two cam angle sensor attachments to which two cam angle sensors are attached, respectively, the cam angle sensors being configured to detect a rotational position of a camshaft of the engine,
   the two cam angle sensors are spaced apart from each other in an engine width direction,
   a recess is formed on an end of the metal cover member toward the resin cover member in the engine length direction and in a center of the metal cover member in the engine width direction such that the recess is positioned between the two cam angle sensor attachments, the recess being notched on an opposite side from the resin cover member in the engine length direction,
   a protrusion is formed on an end of the resin cover member toward the metal cover member in the engine length direction and in a center of the resin cover member in the engine width direction, the protrusion being configured to fit into the recess on the metal cover member,
   a slot is formed in the center of the resin cover member in the engine width direction, the slot extending in the engine length direction toward the metal cover member to reach the protrusion, and
   an injector and a top end of a cylinder pressure sensor are positioned in the slot in a vertical direction of the engine.

2. The structure of claim 1, wherein
a chain cover is mounted to the end of the metal cover member away from the resin cover member in the engine length direction.

3. The structure of claim 2, wherein
the chain cover is separated into a head cover and a block cover, the head cover corresponding to the cylinder head of the engine and the cylinder head cover, and the block cover corresponding to a cylinder block of the engine, and
a transmission is coupled to an end face of the cylinder block of the engine that is toward the metal cover member in the engine length direction, the transmission being coupled via the block cover of the chain cover.

* * * * *